United States Patent
Jung et al.

(10) Patent No.: US 11,999,826 B2
(45) Date of Patent: Jun. 4, 2024

(54) SILANE-BASED FUNCTIONALIZED POLYMER, METHOD OF PREPARING SAME AND POLYMER ELECTROLYTE COMPOSITE MEMBRANE INCLUDING SAME

(71) Applicant: INDUSTRY FOUNDATION OF CHONNAM NATIONAL UNIVERSITY, Gwangju (KR)

(72) Inventors: Ho Young Jung, Gwangju (KR); Jae Shin Jo, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 618 days.

(21) Appl. No.: 16/853,192

(22) Filed: Apr. 20, 2020

(65) Prior Publication Data

US 2020/0339758 A1    Oct. 29, 2020

(30) Foreign Application Priority Data

Apr. 24, 2019   (KR) .................. 10-2019-0047983

(51) Int. Cl.
  *C08G 77/14*    (2006.01)
  *C08G 77/06*    (2006.01)
  *H01M 8/1048*   (2016.01)

(52) U.S. Cl.
  CPC ............. *C08G 77/14* (2013.01); *C08G 77/06* (2013.01); *H01M 8/1048* (2013.01)

(58) Field of Classification Search
  CPC .................................................. C07F 7/0834
  See application file for complete search history.

(56) References Cited

U.S. PATENT DOCUMENTS

2011/0104474 A1* 5/2011 Liu ................. C25B 13/02
                                          427/126.3
2016/0145361 A1* 5/2016 Tsou ................... D01F 1/10
                                          428/221
2016/0222187 A1* 8/2016 Luo .................. C08K 3/013

FOREIGN PATENT DOCUMENTS

KR      10-1085358 B1     11/2011

OTHER PUBLICATIONS

J. Brecher, Graphical Representation Standards for Chemical Structure Diagrams (IUPAC Recommendations 2008), 80 Pure Appl. Chem. 277-410 (2008) (Year: 2008).*
Dow Corning Corporation, Silicone Chemistry Overview, 1-11 (1997) (Year: 1997).*
CAS Abstract and Indexed Compound, Y. Zhan et al., 11 Langmuir, 2103-2108 (1995) (Year: 1995).*
Y. Zhan et al., 11 Langmuir, 2103-2108 (1995) (Year: 1995).*
CAS Abstract and Indexed Compound, A. Baptiste et al., 18 Langmuir, 3916-3922 (2002) (Year: 2002).*
A. Baptiste et al., 18 Langmuir, 3916-3922 (2002) (Year: 2002).*
CAS Abstract and Indexed Compound R. Mouawia et al., 17 Journal of Materials Chemistry, 616-618 (2007) (Year: 2007).*
R. Mouawia et al., 17 Journal of Materials Chemistry, 616-618 (2007) (Year: 2007).*
Office action issued on Apr. 29, 2020 from Korean Patent Office in a counterpart Korean Patent Application No. 10-2019-0047983 (all the cited references are listed in this IDS.).

* cited by examiner

*Primary Examiner* — Alexander R Pagano
(74) *Attorney, Agent, or Firm* — The PL Law Group, PLLC

(57) ABSTRACT

A novel silane-based functionalized polymer is useful as an organic precursor material for forming inorganic particles that are introduced when manufacturing a polymer electrolyte composite membrane. A polymer electrolyte composite membrane according to an embodiment of the present invention includes at least one of a perfluorinated polymer and a hydrocarbon-based polymer, and a silane-based functionalized polymer represented by Chemical Formula 1.

6 Claims, 10 Drawing Sheets

SILANE-BASED FUNCTIONALIZED POLYMER, METHOD OF PREPARING SAME AND POLYMER ELECTROLYTE COMPOSITE MEMBRANE INCLUDING SAME

CROSS REFERENCE TO RELATED APPLICATION

The present application claims priority based on Korean Patent Application No. 10-2019-0047983, filed on Apr. 24, 2019, the entire content of which is incorporated herein for all purposes by this reference.

BACKGROUND OF THE INVENTION

1. Technical Field

The present invention relates to a polymer electrolyte composite membrane and a method of manufacturing the same, and more particularly to a novel silane-based functionalized polymer useful as an organic precursor material for forming inorganic particles that are introduced when manufacturing a polymer electrolyte composite membrane, a method of preparing the same, and a polymer electrolyte composite membrane including the same.

2. Description of the Related Art

For an ion exchange membrane recently applied to a vanadium redox flow battery (VRFB), perfluorinated polymers, developed by Dupont, 3M and FuMA-Tech, are mainly used, but cause problems upon long-term use due to the high price, low chemical stability and high vanadium ion permeability thereof.

In order to solve these problems, techniques of increasing chemical stability and suppressing permeability by introducing nano-sized particles ($SiO_2$ or sulfonated silica) and graphene oxide to a perfluorinated polymer have been proposed. However, degradation in the mechanical properties of composite membranes has been reported due to the rapid decrease in ion conductivity, the limited amount of inorganic material that is introduced (up to 5 wt %), and the nonuniform dispersion caused by the increased amount of the inorganic material.

Therefore, it is necessary to develop novel organic precursors for the introduction of inorganic particles and preparation techniques thereof capable of improving the mechanical properties and permeation performance of the polymer electrolyte composite membrane because of the easy dispersion thereof.

SUMMARY

The present inventors have conducted extensive research and thus have developed a silane-based functionalized polymer having high hydrophilicity in which a silane-based organic precursor is used as a starting material and hydrophilic groups including a sulfonic acid group (—$SO_3H$) and a hydroxyl group (—OH) are additionally introduced into the silane organic precursor material, thus culminating in the present invention.

Accordingly, an objective of the present invention is to provide a novel silane-based functionalized polymer having high hydrophilicity, which may be used as an organic precursor material for forming inorganic particles that are introduced in order to increase the chemical stability of a perfluorinated polymer membrane.

Another objective of the present invention is to provide a method of preparing a silane-based functionalized polymer, which enables the synthesis of a functionalized polymer gel with high yield and excellent dispersibility even at a low temperature and enables mass production at low cost because of the low cost of synthetic raw materials and simple synthesis processing.

Still another objective of the present invention is to provide a polymer electrolyte composite membrane and a method of manufacturing the same, in which the amount of an ion-conductive polymer that is introduced may be minimized by maximizing the amount of a silane-based functionalized polymer that is introduced, thus contributing to lowering the price of the polymer electrolyte composite membrane, facilitating the dispersion of the organic precursor to thus improve the mechanical properties and permeation performance of the composite membrane, and increasing the amount of an ion that is exchanged due to the additional introduction of a hydrophilic functional group, thus promising increased ion conductivity.

Yet another objective of the present invention is to provide an energy storage device including a redox flow battery or a fuel cell, a water electrolysis device and a water treatment device, including the polymer electrolyte composite membrane having superior properties such as low permeability and high ion conductivity and thus being favorable for long-term operation.

The objectives of the present invention are not limited to the foregoing, and should be understood to include all objectives that can be reasonably anticipated by those skilled in the art from the following description, even when not explicitly mentioned.

In order to accomplish the above objectives, the present invention provides a silane-based functionalized polymer represented by Chemical Formula 1 below.

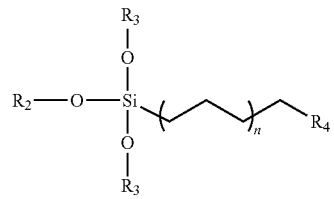

[Chemical Formula 1]

In Chemical Formula 1, n is a real number greater than 0, $R_1$, $R_2$ and $R_3$ are any one selected from the group consisting of —$SO_3H$, —COOH, —H, —SH, —OH,

—$OCH_2OCH_3$, —$NH_2$, =NH —$OCH_3$, and —$O(CH_2)_n$—$R_5$, and $R_4$ is any one selected from the group consisting of —$SO_3H$, —COOH, —H, —SH, —OH,

$OCH_2$—$CH_3$, —$OCH_3$, and —$O(CH_2)_n$—$R_5$.

In a preferred embodiment of the present invention, when at least one of $R_1$, $R_2$, $R_3$ and $R_4$ is —O(CH$_2$)$_n$—R$_5$, $R_5$ is any one selected from the group consisting of —SO$_3$H, —COOH, —SH, —H, —OH,

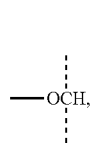

—OCH$_2$—CH$_3$, and —OCH$_3$.

In addition, the present invention provides a method of preparing a silane-based functionalized polymer including preparing a silica precursor solution, forming a silane precursor gel by subjecting the silica precursor solution to oxidation, and forming a silane functionalized polymer sol by subjecting the silane precursor gel to acid hydrolysis.

In a preferred embodiment of the present invention, the forming of the silane precursor gel is performed in a manner in which the silica precursor solution is added with diluted peroxide, heated, homogenized and allowed to stand for a predetermined period of time.

In a preferred embodiment of the present invention, the forming of the silane functionalized polymer sol is performed in a manner in which the silane precursor gel is added with an inorganic acid solution, homogenized and allowed to stand for a predetermined period of time.

In a preferred embodiment of the present invention, the preparing the silica precursor solution is performed using dimethylacetamide (DMAc), 2,2-bis(hydroxymethyl)butyric acid (DMBA) and 3-mercaptopropyltrimethoxysilane (MPTMS).

In addition, the present invention provides a polymer electrolyte composite membrane including at least one of a perfluorinated polymer and a hydrocarbon-based polymer and a silane-based functionalized polymer represented by Chemical Formula 1 below.

[Chemical Formula 1]

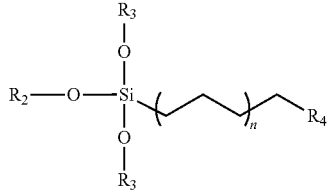

In Chemical Formula 1, n is a real number greater than 0, $R_1$, $R_2$ and $R_3$ are any one selected from the group consisting of —SO$_3$H, —COOH, —H, —SH, —OH,

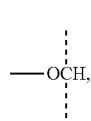

—OCH$_2$OCH$_3$, —NH$_2$, =NH —OCH$_3$, and —O(CH$_2$)$_n$—R$_5$, and $R_4$ is any one selected from the group consisting of —SO$_3$H, —COOH, —H, —SH, —OH,

OCH$_2$—CH$_3$, —OCH$_3$, and —O(CH$_2$)$_n$—R$_5$.

In a preferred embodiment of the present invention, at least one of the perfluorinated polymer and the hydrocarbon-based polymer, and the silane-based functionalized polymer are used at a weight ratio of 95:5 to 30:70.

In a preferred embodiment of the present invention, the perfluorinated polymer is at least one selected from the group consisting of a sulfonated tetrafluoroethylene based fluoropolymer-copolymer such as NAFION (Dupont)), 3M IONOMER (3M), FUMION, ACIPLEX, AQUIVION, perfluorinated sulfonic acid polymer (PFSA), polytetrafluoroethylene, poly(vinylidene fluoride), poly(vinyl fluoride), poly(vinylidene fluoro-co-perfluorinated alkylvinylether), Chinese perfluorinated polymer and combinations thereof.

In a preferred embodiment of the present invention, the hydrocarbon-based polymer is at least one selected from the group consisting of sulfonated polystyrene, sulfonated polyether ketone, sulfonated polyether ether ketone, sulfonated poly(4-phenoxybenzoyl-1,4-phenylene), sulfonated polyether sulfone, sulfonated polyarylene ether sulfone, sulfonated poly(phenylquinoxaline), sulfonated polysulfone, sulfonated poly(2,6-dimethyl-1,4-phenylene oxide), sulfonated polyimide, sulfonated polybenzimidazole, and sulfonated polyphenylene sulfide.

In a preferred embodiment of the present invention, the amount of the silane-based functionalized polymer is in proportion to water uptake of the composite membrane and is in inverse proportion to ion conductivity of the composite membrane.

In addition, the present invention provides a method of manufacturing a polymer electrolyte composite membrane, including preparing a silane-based functionalized polymer solution by dissolving a silane-based functionalized polymer represented by Chemical Formula 1 below in a solvent, preparing a membrane precursor solution by adding the silane-based functionalized polymer solution with an ion-conductive material solution, and forming a polymer electrolyte composite membrane by shaping the membrane precursor solution.

[Chemical Formula 1]

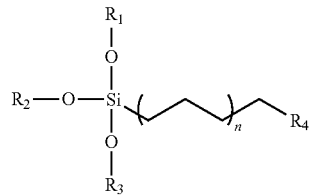

In Chemical Formula 1, n is a real number greater than 0, $R_1$, $R_2$ and $R_3$ are any one selected from the group consisting of —SO$_3$H, —COOH, —H, —SH, —OH,

—OCH$_2$OCH$_3$, —NH$_2$, =NH —OCH$_3$, and —O(CH$_2$)$_n$—R$_5$, and R$_4$ is any one selected from the group consisting of —SO$_3$H, —COOH, —H, —SH, —OH,

OCH$_2$—CH$_3$, —OCH$_3$, and —O(CH$_2$)$_n$—R$_5$.

In a preferred embodiment of the present invention, the solvent, which is used in the preparing the silane-based functionalized polymer solution and the preparing the membrane precursor solution by adding the silane-based functionalized polymer solution with the ion-conductive material solution, is at least one selected from the group consisting of deionized water, all alcohol solvents including methanol, ethanol and isopropanol, dimethylsulfoxide, N,N-dimethylacetamide, N-methyl-2-pyrrolidinone, and N,N-dimethylformamide.

In a preferred embodiment of the present invention, the ion-conductive material is at least one of the perfluorinated polymer and the hydrocarbon-based polymer, and the membrane precursor solution includes the ion-conductive material and the silane-based functionalized polymer at a weight ratio of 95:5 to 30:70.

In a preferred embodiment of the present invention, the forming the polymer electrolyte composite membrane includes a membrane formation step of forming a precursor membrane by casting the membrane precursor solution to afford a casting layer, which is then dried in a vacuum, and a pretreatment step of activating a hydrophilic group in the precursor membrane.

In a preferred embodiment of the present invention, the membrane formation step includes drying the casting layer in a vacuum at a temperature of 70° C. or less, primarily heat-treating the dried casting layer at a temperature of 70° C. to 90° C., and conducting secondary heat treatment at a temperature of 100° C. or more.

In a preferred embodiment of the present invention, the pretreatment step includes a primary immersion step of immersing the precursor membrane in deionized water, a secondary immersion step of immersing the primarily immersed precursor membrane in a peroxide aqueous solution and then in deionized water at a temperature ranging from 20° C. to 90° C., and a tertiary immersion step of immersing the secondarily immersed precursor membrane in a strong acid aqueous solution and then in deionized water at a temperature ranging from 20° C. to 90° C.

In addition, the present invention provides an energy storage device including the above polymer electrolyte composite membrane or a polymer electrolyte composite membrane manufactured through the above method.

In a preferred embodiment of the present invention, the energy storage device is a redox flow battery or a fuel cell.

In addition, the present invention provides a water electrolysis device including the above polymer electrolyte composite membrane or a polymer electrolyte composite membrane manufactured by the above method.

In addition, the present invention provides a water treatment device including the above polymer electrolyte composite membrane or a polymer electrolyte composite membrane manufactured by the above method.

The present invention has the following effects.

Specifically, a silane-based functionalized polymer according to the present invention is very hydrophilic and thus can be used as an organic precursor material for forming inorganic particles that are introduced in order to increase the chemical stability of a perfluorinated polymer membrane.

In addition, a method of preparing the silane-based functionalized polymer according to the present invention enables the synthesis of a functionalized polymer gel with high yield and excellent dispersibility even at a low temperature and enables mass production at low cost because of the low cost of synthetic raw materials and simple synthesis processing.

In addition, in a polymer electrolyte composite membrane and a method of manufacturing the same according to the present invention, the amount of an ion-conductive polymer that is introduced can be minimized by maximizing the amount of the silane-based functionalized polymer that is introduced, thus contributing to lowering the price of the polymer electrolyte composite membrane, facilitating the dispersion of the organic precursor to thus improve the mechanical properties and the permeation performance of the composite membrane, and increasing the amount of an ion that is exchanged due to the additional introduction of a hydrophilic functional group, thus promising increased ion conductivity.

In addition, according to the present invention, an energy storage device including a redox flow battery or a fuel cell, a water electrolysis device and/or a water treatment device include the polymer electrolyte composite membrane having superior properties such as low permeability and high ion conductivity and are thus favorable for long-term operation.

The effects of the present invention are not limited to the foregoing, and should be understood to include all effects that can be reasonably anticipated by those skilled in the art from the following description, even when not explicitly mentioned.

DETAILED DESCRIPTION

Figure 1:
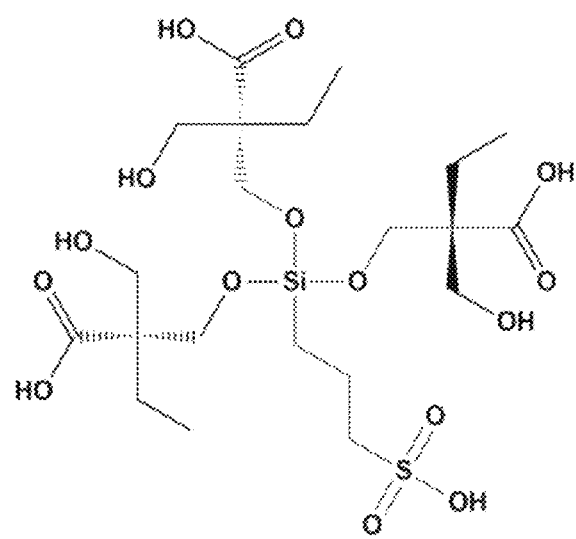
FIG. 1 shows the chemical structure of a silane-based sulfonic acid polymer (ASFP), which is an example of a silane-based functionalized polymer according to the present invention.

The terminology used in the present invention is merely used to describe particular embodiments, and is not intended to limit the present invention. As used herein, the singular forms are intended to include the plural forms as well, unless the context clearly indicates otherwise. It will be understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

It will be further understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element.

Unless otherwise defined, all terms including technical and scientific terms used herein have the same meanings as commonly understood by one of ordinary skill in the art to which the present invention belongs. It will be further understood that terms used herein should be interpreted as having meanings consistent with their meanings in the context of this specification and the relevant art, and are not to be interpreted in an idealized or overly formal sense unless expressly so defined herein.

In interpreting elements, it is to be understood that an error range is included even if there is no separate description thereof. In particular, the terms "about", "substantially" and the like are intended to be taken to mean an approximation to a numerical value when presenting the preparation and material tolerances inherent in the meanings mentioned.

In the case of a description of a temporal relationship, for example, when the temporal relationship is described as 'after', 'following', 'subsequently', 'before', etc., this includes non-consecutive cases unless 'immediately or 'directly' is used.

Hereinafter, a detailed description will be given of the technical configuration of the present invention with reference to the accompanying drawings and preferred embodiments.

However, the present invention is not limited to the embodiments described herein, and the same reference numerals in different forms represent the same elements.

The present invention pertains to a novel silane-based functionalized polymer in which a silane-based organic precursor is used as a starting material and hydrophilic groups including a sulfonic acid group (—SO$_3$H) and a hydroxyl group (—OH) are additionally introduced into the silane organic precursor material and to a method of preparing the same, characterized in that the silane-based functionalized polymer having high hydrophilicity is used as an organic precursor material for forming inorganic particles that are introduced in order to increase the chemical stability of a perfluorinated polymer membrane.

A conventional technique of directly introducing nano-sized particles and graphene oxide to a perfluorinated polymer causes problems such as a rapid decrease in ion conductivity and nonuniform dispersion due to the increased amount of the inorganic material, undesirably deteriorating the mechanical properties of the composite membrane. In the present invention, however, the above problems are solved by developing a novel silane-based functionalized polymer in which an inorganic material may be converted into inorganic particles starting from an organic precursor using heat during casting.

Therefore, the silane-based functionalized polymer of the present invention has the structure represented by Chemical Formula 1 below.

[Chemical Formula 1]

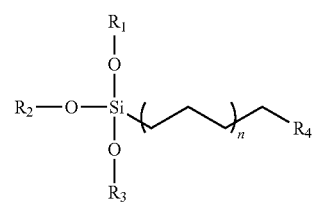

In Chemical Formula 1, n is a real number greater than 0, represents the number (integer) of carbons bound between R$_4$ and Si in an embodiment, and may vary depending on the molecular weight. R$_1$, R$_2$, R$_3$ and R$_4$ may represent various functional groups such as a sulfonic acid functional group, a hydroxyl functional group, a carboxyl functional group and alkyl hydrocarbon. The silane-based functionalized polymer having the structure of Chemical Formula 1 due to the functional group introduced therein may be increased in view of ion exchange capacity and water uptake capacity.

In Chemical Formula 1, the alkyl chain is linked between Si and R$_4$, R$_1$, R$_2$ and R$_3$ are any one selected from the group consisting of —SO$_3$H, —COOH, —H, —SH, —OH,

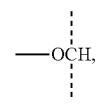

—OCH$_2$OCH$_3$, —NH$_2$, =NH —OCH$_3$, and —O(CH$_2$)$_n$—R$_5$, and R$_4$ is any one selected from the group consisting of —SO$_3$H, —COOH, —H, —SH, —OH,

—OCH$_2$—CH$_3$, —OCH$_3$, and —O(CH$_2$)$_n$—R$_5$. Here, in the case of —O(CH$_2$)$_n$—R$_5$, R$_5$ may include —SO$_3$H, —COOH, —H, —SH, —OH,

—OCH$_2$—CH$_3$, —OCH$_3$, etc.

When the functional groups of R$_1$, R$_2$, R$_3$ and R$_4$ are included, high thermal stability and internal hydrogen bonding may result. In particular, when R$_1$, R$_2$ and R$_3$ are an alkyl hydroxyl group that forms an internal hydrogen bond together with a silicon bond (Si—O—C), the chemical stability may be greatly increased due to the above bond.

The silane-based functionalized polymer of the present invention may be exemplified by an alkoxysilane-functionalized polymer (ASFP) having the structural formula shown in FIG. 1.

In addition, the present invention pertains to a method of preparing the silane-based functionalized polymer including preparing a silica precursor solution, forming a silane precursor gel by subjecting the silica precursor solution to oxidation, and forming a silane functionalized polymer sol by subjecting the silane precursor gel to acid hydrolysis.

In an embodiment of the present invention, the silica precursor solution may include dimethylacetamide (DMAc), 2,2-bis(hydroxymethyl)butyric acid (DMBA) and 3-mercaptopropyltrimethoxysilane (MPTMS). Moreover, forming the silane precursor gel is performed in a manner in which the silica precursor solution is added with diluted peroxide, heated, homogenized and then allowed to stand for a predetermined period of time, and forming the silane functionalized polymer sol is performed in a manner in which the silane precursor gel is added with an inorganic acid solution, homogenized and then allowed to stand for a predetermined period of time.

Silane-based hyperbranched polymers known to date are used by substituting the terminal groups thereof with various structures so as to be adapted for the end use thereof, but the sulfonic acid group, which imparts high ion conductivity, has been used in a very limited range of forms in silane, undesirably causing problems such as increased preparation costs and complicated synthesis processing when introducing sulfonic acid groups. However, the preparation method of the present invention enables synthesis of the functionalized polymer gel with high yield and excellent dispersibility even at a low temperature, and also enables mass production at low cost because of the low cost of synthetic raw materials and simple synthesis processing.

In addition, the present invention pertains to a polymer electrolyte composite membrane including at least one of a perfluorinated polymer and a hydrocarbon-based polymer, and a silane-based functionalized polymer represented by Chemical Formula 1. In an embodiment thereof, at least one of the perfluorinated polymer and the hydrocarbon-based polymer and the silane-based functionalized polymer may be used at a weight ratio of 95:5 to 30:70.

In the polymer electrolyte composite membrane of the present invention, the perfluorinated polymer may include all known perfluorinated polymers that may be used in the polymer electrolyte membrane, and is specifically at least one selected from the group consisting of NAFION (Dupont), 3M IONOMER (3M), FUMION, ACIPLEX, AQUIVION, perfluorinated sulfonic acid polymer (PFSA), Chinese perfluorinated polymer, polytetrafluoroethylene, poly(vinylidene fluoride), poly(vinyl fluoride), poly(vinylidene fluoro-co-perfluorinated alkylvinylether) and combinations thereof.

The hydrocarbon-based polymer may be at least one selected from the group consisting of sulfonated polystyrene, sulfonated polyether ketone, sulfonated polyether ether ketone, sulfonated poly(4-phenoxybenzoyl-1,4-phenylene), sulfonated polyether sulfone, sulfonated polyarylene ether sulfone, sulfonated poly(phenylquinoxaline), sulfonated polysulfone, sulfonated poly(2,6-dimethyl-1,4-phenylene oxide), sulfonated polyimide, sulfonated polybenzimidazole, and sulfonated polyphenylene sulfide.

The properties of the polymer electrolyte composite membrane according to the present invention vary depending on the amount of the silane-based functionalized polymer. In particular, as the amount of the silane-based functionalized polymer increases, the water uptake of the composite membrane increases in proportion thereto, and the ion conductivity of the composite membrane reaches the highest point and then decreases in inverse proportion thereto.

In addition, the present invention pertains to a method of manufacturing the polymer electrolyte composite membrane including preparing a silane-based functionalized polymer solution by dissolving the silane-based functionalized polymer represented by Chemical Formula 1 in a solvent, preparing a membrane precursor solution by adding the silane-based functionalized polymer solution with an ion-conductive material solution, and forming a polymer electrolyte composite membrane by shaping the membrane precursor solution.

Thereby, in the present invention, inorganic particles are not directly added to the polymer composite membrane, but during the manufacture of the polymer composite membrane, nanosilica particles are generated and included in the polymer membrane, thus forming a membrane structure in which nanosilica particles as the inorganic particles are very uniformly dispersed in the organic polymer, thereby solving a problem of heterogeneous distribution of nanoparticles in general organic-inorganic nanocomposite polymer membranes.

Here, the solvent included in the silane-based functionalized polymer solution and the ion-conductive material solution may include all known solvents that are able to dissolve the silane-based functionalized polymer and the ion-conductive material. In an embodiment thereof, the solvent may be at least one selected from the group consisting of deionized water, alcohol solvents including ethanol, isopropanol and methanol, dimethyl sulfoxide, N,N-dimethylacetamide, N-methyl-2-pyrrolidone, and N,N-dimethylformamide.

Moreover, the membrane precursor solution may include the ion-conductive material and the silane-based functionalized polymer at a weight ratio of 95:5 to 30:70, and the ion-conductive material may be at least one of the perfluorinated polymer and the hydrocarbon-based polymer. Here, the mixing ratio is determined experimentally, and if the amount of the polymer is less than 30 parts by weight or exceeds 95 parts by weight, the viscosity is excessively low or high, and thus workability may decrease and it may be difficult to control the thickness of the polymer membrane. Hence, the optimal solution concentration for the production of a polymer membrane having the required thickness was experimentally set. Here, the concentration of the ion-conductive material including the perfluorinated polymer or the hydrocarbon-based polymer in the solution fell in the range of 1% to 90%.

Preparing the membrane precursor solution may be performed in a manner in which the silane-based functionalized polymer solution and the ion-conductive material solution are mixed at a predetermined ratio to afford a homogeneous solution. Here, these components may be mixed at various mixing ratios depending on the required composition of the finished membrane. The homogeneous membrane precursor solution may be obtained through stirring for ones of min to ones of hr in a reactor maintained at a temperature of 20° C. to 50° C.

Forming the polymer electrolyte composite membrane includes a membrane formation step of forming a precursor membrane by casting the membrane precursor solution to afford a casting layer, which is then dried in a vacuum, and a pretreatment step of activating hydrophilic groups in the precursor membrane. The casting process may be performed by casting the membrane precursor solution on a flat plate such as a glass plate to form a casting layer, and the membrane formation step includes drying the casting layer in a vacuum at a temperature lower than 70° C., primarily heat-treating the dried casting layer at a temperature of 70° C. to 90° C., and conducting secondary heat treatment at a temperature of 100° C. or higher. As described above, the membrane formation step serves to form a precursor membrane by reacting the silane-based functionalized polymer and the ion-conductive material while removing the solvent from the casting layer, and the generation of nanosilica particles from the silane-based functionalized polymer and the ion-conductive material may be induced through heating to a predetermined temperature. In an embodiment of the present invention, the casting layer is maintained in an oven in a vacuum at 60° C. for 8 hr, and is additionally treated at 80° C. for 8 hr and at 100° C. for 8 hr, thereby obtaining a precursor membrane.

The pretreatment step removes contaminants such as organic substances from the surface of the obtained precursor membrane and simultaneously activates hydrophilic groups in the precursor membrane to thus form ion clusters. In an embodiment of the present invention, it may include a primary immersion step of immersing the precursor membrane in deionized water, a secondary immersion step of immersing the primarily immersed precursor membrane in a diluted peroxide aqueous solution and then in deionized water, and a tertiary immersion step of immersing the secondarily immersed precursor membrane in an acid aqueous solution and then in deionized water. The primary immersion step is performed for a long time, specifically 24 hr or more, and the immersion in the peroxide aqueous solution, deionized water and strong acid aqueous solution during the secondary and tertiary immersion steps may be performed for a short time, that is, within 1 hr. In the following examples, aqueous hydrogen peroxide was used as the peroxide aqueous solution, and a sulfuric acid aqueous solution was used as the acid aqueous solution, and all strong acid solutions, including sulfuric acid, may be diluted and used. Here, the immersion process may be conducted in the temperature range of 20° C. to 90° C. Moreover, the polymer electrolyte composite membrane that is ultimately obtained may be stored after being dried in a vacuum oven at a temperature of 60° C. to 130° C.

Through the above configuration, the polymer electrolyte composite membrane of the present invention may exhibit permeability and ion selectivity improved by 40% compared to a conventional polymer electrolyte membrane, and may realize superior thermal stability due to the introduction of silica particles.

Therefore, an energy storage device including a redox flow battery or a fuel cell and a water treatment device according to the present invention include the polymer electrolyte composite membrane having low permeability and high ion selectivity, thereby ensuring stable performance during long-term operation.

Example 1

1. Preparation of Solution

A silica precursor solution was obtained in a manner in which a 1 M solution of 2,2-bis(hydroxymethyl)butyric acid (DMBA) and 3-mercaptopropyltrimethoxysilane (MPTMS) in dimethylacetamide (DMAc) was prepared, heated to 40° C. and then stirred for 5 hr.

2. Formation of Gel

A white silane precursor gel was obtained through oxidation in a manner in which the silica precursor solution was added with 20 ml of 30% aqueous hydrogen peroxide, heated to 60° C., stirred for 5 hr and allowed to stand at 70° C.

3. Formation of Sol

A white silane-based functionalized polymer (ASFP) sol was obtained through acid hydrolysis in a manner in which the silane precursor gel was added with 0.1 M HCl, stirred at room temperature for 5 hr and allowed to stand at room temperature for 1 hr. Here, ASFP has the structural formula shown in FIG. 1.

Example 2

1. Preparation of Silane-Based Functionalized Polymer Solution

Before preparation of a polymer electrolyte composite solution, 75 g of the polymer sol was diluted in 75 g of DMAc to afford a 50 w/w % solution, in order to improve the fluidity of the silane-based functionalized polymer sol obtained in Example 1.

2. Preparation of Membrane Precursor Solution

As an ion-conductive material, a perfluorinated sulfonic acid polymer (PFSA) or a hydrocarbon-based polymer (e.g., sulfonated poly(arylene ether sulfone (SPES)) was added to DMAc and stirred for 1 to 12 hr on a hot plate maintained at a temperature of 20° C. to 80° C. to afford an ion-conductive material solution in an amount of 20% of the total weight thereof. Thereafter, the silane-based functionalized polymer solution and the ion-conductive material solution were mixed in a solution phase such that the amount of the perfluorinated ion-conductive material was 85 wt % and the amount of the silane-based functionalized polymer was 15 wt % based on a solid content of 2 g in the membrane precursor solution, followed by stirring at room temperature for 1 hr, thus preparing a membrane precursor solution 1.

3. Formation of Membrane

3-1. Membrane Formation Step

The membrane precursor solution 1 was poured onto a glass plate at room temperature and made thin using a doctor blade to afford a casting layer, which was then gradually heated in the sequence of 50° C. (drying), 80° C. (primary heat treatment), and 110° C. (secondary heat treatment) for 24 hr in a vacuum oven. Thereafter, the temperature of the oven was lowered to room temperature, thus obtaining a precursor membrane 1.

3-2. Pretreatment Step

The precursor membrane 1 thus obtained was primarily immersed in deionized water for 24 hr, followed by secondary immersion in 3% hydrogen peroxide and then in deionized water at 50° C. for 30 min each, and tertiary immersion in a 0.5 M $H_2SO_4$ aqueous solution and then in deionized water at 50° C. for 30 min each, thereby obtaining a polymer electrolyte composite membrane 1 (P85-A15).

Example 3

A polymer electrolyte composite membrane 2 (P75-A25) was obtained in the same manner as in Example 2, with the exception that a membrane precursor solution 2 was prepared by mixing the silane-based functionalized polymer solution and the ion-conductive material solution in a solution phase such that the amount of the ion-conductive material was 75 wt % and the amount of the silane-based functionalized polymer was 25 wt % based on a solid content of 2 g in the membrane precursor solution, followed by stirring at room temperature for 1 hr, during the preparation of the membrane precursor solution of Example 2.

Example 4

A polymer electrolyte composite membrane 3 (P60-A40) was obtained in the same manner as in Example 2, with the exception that a membrane precursor solution 3 was prepared by mixing the silane-based functionalized polymer solution and the ion-conductive material solution in a solution phase such that the amount of the ion-conductive material was 60 wt % and the amount of the silane-based functionalized polymer was 40 wt % based on a solid content of 2 g in the membrane precursor solution, followed by stirring at room temperature for 1 hr, during the preparation of the membrane precursor solution of Example 2.

Example 5

A polymer electrolyte composite membrane 4 (P50-A50) was obtained in the same manner as in Example 2, with the exception that a membrane precursor solution 4 was prepared by mixing the silane-based functionalized polymer solution and the ion-conductive material solution in a solution phase such that the amount of the ion-conductive material was 50 wt % and the amount of the silane-based functionalized polymer was 50 wt % based on a solid content of 2 g in the membrane precursor solution, followed by stirring at room temperature for 1 hr, during the preparation of the membrane precursor solution of Example 2.

Example 6

A polymer electrolyte composite membrane 5 (P40-A60) was obtained in the same manner as in Example 2, with the exception that a membrane precursor solution 5 was prepared by mixing the silane-based functionalized polymer solution and the ion-conductive material solution in a solution phase such that the amount of the ion-conductive material was 40 wt % and the amount of the silane-based functionalized polymer was 60 wt % based on a solid content of 2 g in the membrane precursor solution, followed by stirring at room temperature for 1 hr, during the preparation of the membrane precursor solution of Example 2.

Example 7

A polymer electrolyte composite membrane 6 (P30-A70) was obtained in the same manner as in Example 2, with the exception that a membrane precursor solution 6 was prepared by mixing the silane-based functionalized polymer solution and the ion-conductive material solution in a solution phase such that the amount of the ion-conductive material was 30 wt % and the amount of the silane-based functionalized polymer was 70 wt % based on a solid content of 2 g in the membrane precursor solution, followed by stirring at room temperature for 1 hr, during the preparation of the membrane precursor solution of Example 2.

Example 8

A polymer electrolyte composite membrane 7 (S80-A20) was obtained in the same manner as in Example 2, with the exception that a membrane precursor solution 7 was prepared by mixing the silane-based functionalized polymer solution and the hydrocarbon-based ion-conductive material (SPES) solution in a solution phase such that the amount of the ion-conductive material was 80 wt % and the amount of the silane-based functionalized polymer was 20 wt % based on a solid content of 2 g in the membrane precursor solution, followed by stirring at room temperature for 1 hr, during the preparation of the membrane precursor solution of Example 2.

Example 9

A polymer electrolyte composite membrane 8 (S70-A30) was obtained in the same manner as in Example 2, with the exception that a membrane precursor solution 8 was prepared by mixing the silane-based functionalized polymer solution and the hydrocarbon-based ion-conductive material (SPES) solution in a solution phase such that the amount of the ion-conductive material was 70 wt % and the amount of the silane-based functionalized polymer was 30 wt % based on a solid content of 2 g in the membrane precursor solution, followed by stirring at room temperature for 1 hr, during the preparation of the membrane precursor solution of Example 2.

Example 10

A polymer electrolyte composite membrane 9 (S60-A40) was obtained in the same manner as in Example 2, with the exception that a membrane precursor solution 9 was prepared by mixing the silane-based functionalized polymer solution and the hydrocarbon-based ion-conductive material (SPES) solution in a solution phase such that the amount of the ion-conductive material was 60 wt % and the amount of the silane-based functionalized polymer was 40 wt % based on a solid content of 2 g in the membrane precursor solution, followed by stirring at room temperature for 1 hr, during the preparation of the membrane precursor solution of Example 2.

Example 11

A polymer electrolyte composite membrane 10 (S50-A50) was obtained in the same manner as in Example 2, with the exception that a membrane precursor solution 10 was prepared by mixing the silane-based functionalized polymer solution and the hydrocarbon-based ion-conductive material (SPES) solution in a solution phase such that the amount of the ion-conductive material was 50 wt % and the amount of the silane-based functionalized polymer was 50 wt % based on a solid content of 2 g in the membrane precursor solution, followed by stirring at room temperature for 1 hr, during the preparation of the membrane precursor solution of Example 2.

Example 12

A polymer electrolyte composite membrane 11 (S40-A60) was obtained in the same manner as in Example 2, with the exception that a membrane precursor solution 11 was prepared by mixing the silane-based functionalized polymer solution and the hydrocarbon-based ion-conductive material (SPES) solution in a solution phase such that the amount of the ion-conductive material was 40 wt % and the amount of the silane-based functionalized polymer was 60 wt % based on a solid content of 2 g in the membrane precursor solution, followed by stirring at room temperature for 1 hr, during the preparation of the membrane precursor solution of Example 2.

Example 13

A polymer electrolyte composite membrane 12 (S30-A70) was obtained in the same manner as in Example 2, with the exception that a membrane precursor solution 12 was prepared by mixing the silane-based functionalized polymer solution and the hydrocarbon-based ion-conductive material (SPES) solution in a solution phase such that the amount of the ion-conductive material was 30 wt % and the amount of the silane-based functionalized polymer was 70 wt % based on a solid content of 2 g in the membrane precursor solution, followed by stirring at room temperature for 1 hr, during the preparation of the membrane precursor solution of Example 2.

Comparative Examples 1, 2 and 3

Commercially available cation exchange membranes NAFION 212, PFSA and SPES were used as Comparative Examples 1, 2 and 3, respectively.

Test Example 1

By confirming that ASFP having the structural formula shown in FIG. 1 was the silane-based functionalized polymer prepared in Example 1, in order to determine whether ASFP having the corresponding structure was synthesized, it was analyzed together with MPTMS and DMBA, which are reactants of the material synthesis process, as a control, through Fourier-transform infrared spectroscopy (FT-IR), $^{13}C$ NMR and $^{1}H$ NMR. The results thereof are shown in FIGS. 2, 3 and 4.

Figure 2:
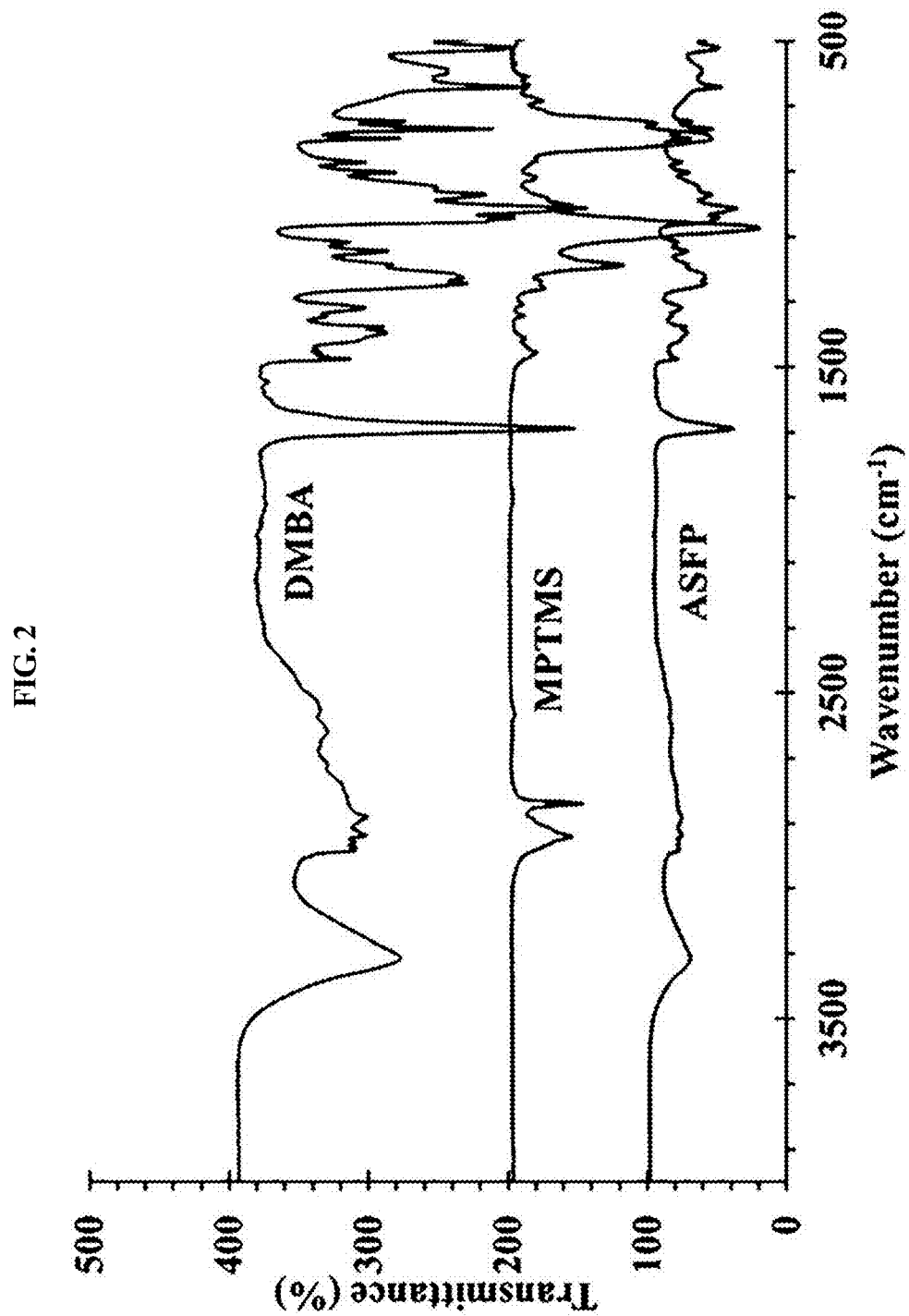
FIG. 2 is a graph showing the results of measurement of FT-IR of the silane-based sulfonic acid polymer of FIG. 1.

As shown in FIG. 2, the peak of —OH in the ASFP structure was observed at 3309 $cm^{-1}$, and the peak appeared broad due to internal hydrogen bonding. The peaks of Si—O—C and $SO_3H$ were observed near 975 $cm^{-1}$ and 1015 $cm^{-1}$, respectively, and C=O was observed at 1691 $cm^{-1}$. Moreover, alkyls (—$CH_2$, —$OCH_2$) appeared at 2938 $cm^{-1}$ and 1395 $cm^{-1}$, respectively. Through the above analysis, the chemical structure shown in FIG. 1 was verified, and it was confirmed that the synthesis of ASFP having hydrophilic groups through acid hydrolysis and sulfonation was completed.

Figure 3:
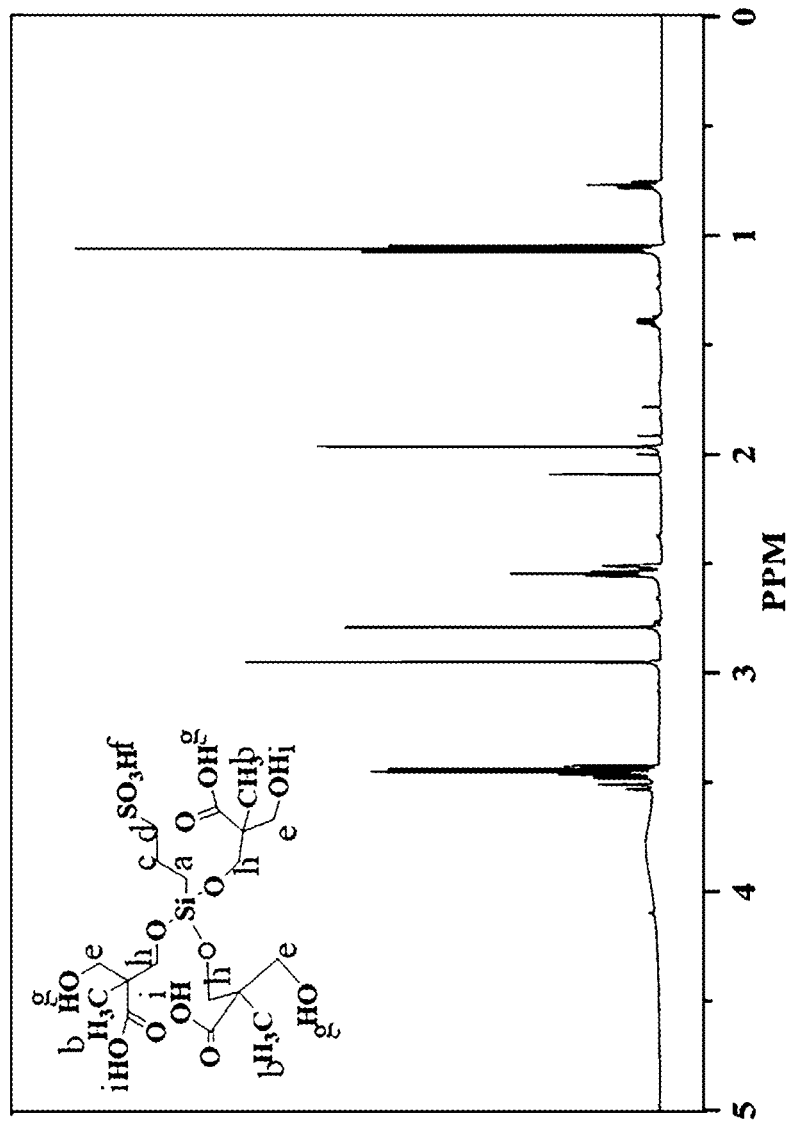
FIG. 3 is a graph showing the results of measurement of $^1$H-NMR of the silane-based sulfonic acid polymer of FIG. 1.
Figure 4:
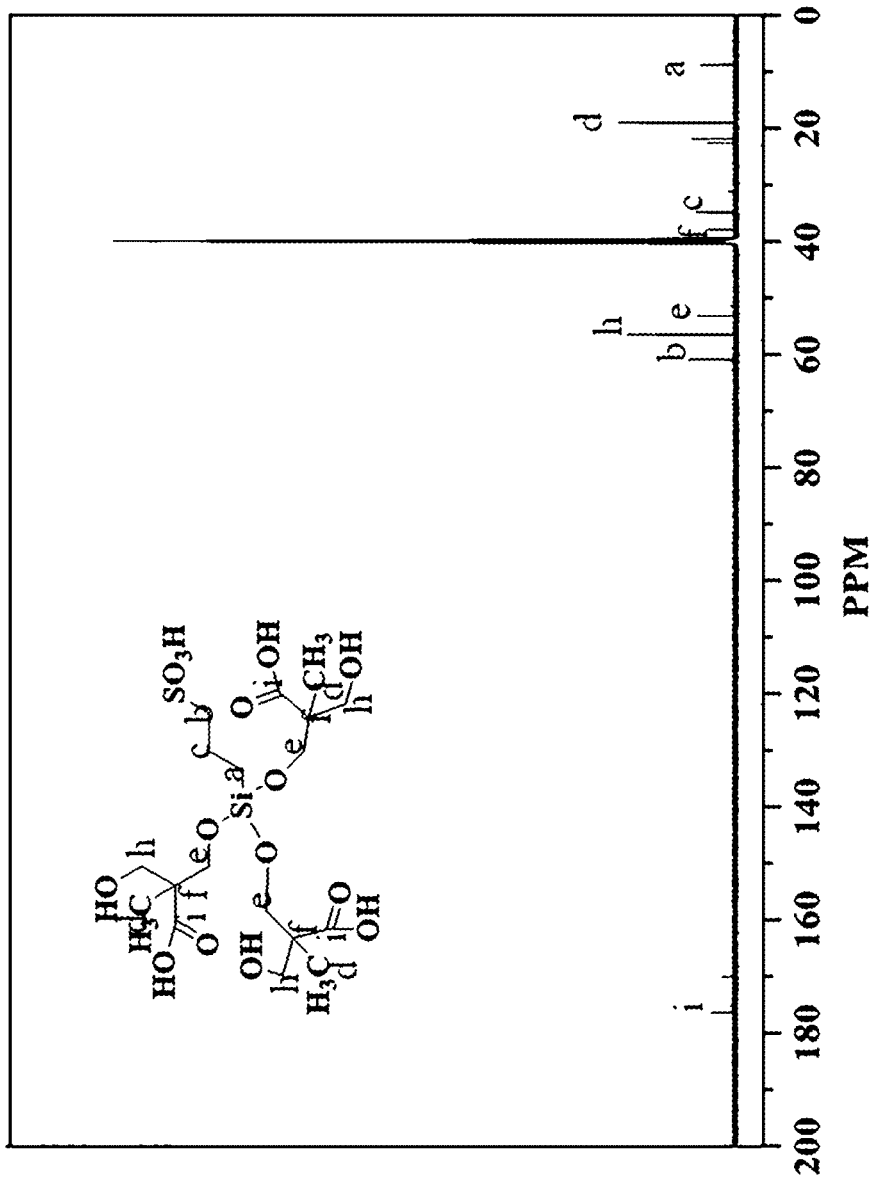
FIG. 4 is a graph showing the results of measurement of $^{13}$C-NMR of the silane-based sulfonic acid polymer of FIG. 1.

Based on the results of analysis of $^{1}H$-NMR of FIG. 3 and $^{13}C$-NMR of FIG. 4, the synthesis of ASFP having hydrophilic groups was confirmed. As shown in $^{1}H$-NMR of FIG. 3, the peaks of Si—$CH_2$ and Si—O—$CH_2$ were observed near 0.5 ppm and 3.6 ppm, indicating that silica was present in the chemical structure. $CH_3$ proton resonance was confirmed near 1.1 ppm, and the peak of $SO_3H$ was observed near 2.8 ppm, from which the presence of a sulfonation group of ASFP was confirmed. The OH peak of —$CH_2$—OH was observed near 2.9 ppm, but the —COOH peak was not observed near 11 ppm. As is apparent from FT-IR, the —COOH group underwent internal hydrogen bonding with alkoxysilane (Si—O—$CH_2$), and thus the peak thereof was not observed.

Also, as shown in $^{13}C$-NMR of FIG. 4, the carbon of the carbonyl group (C=O) and silyl carbon (Si—C) were observed near 176.1 ppm and 0.9 ppm, respectively. The carbon peak of the carboxyl group was observed near 56.5 ppm.

Based on the above analysis results, the presence of the carboxyl group and the hydroxyl group in the compound and internal hydrogen bonding between hydrophilic groups were confirmed.

Test Example 2

Figure 5:
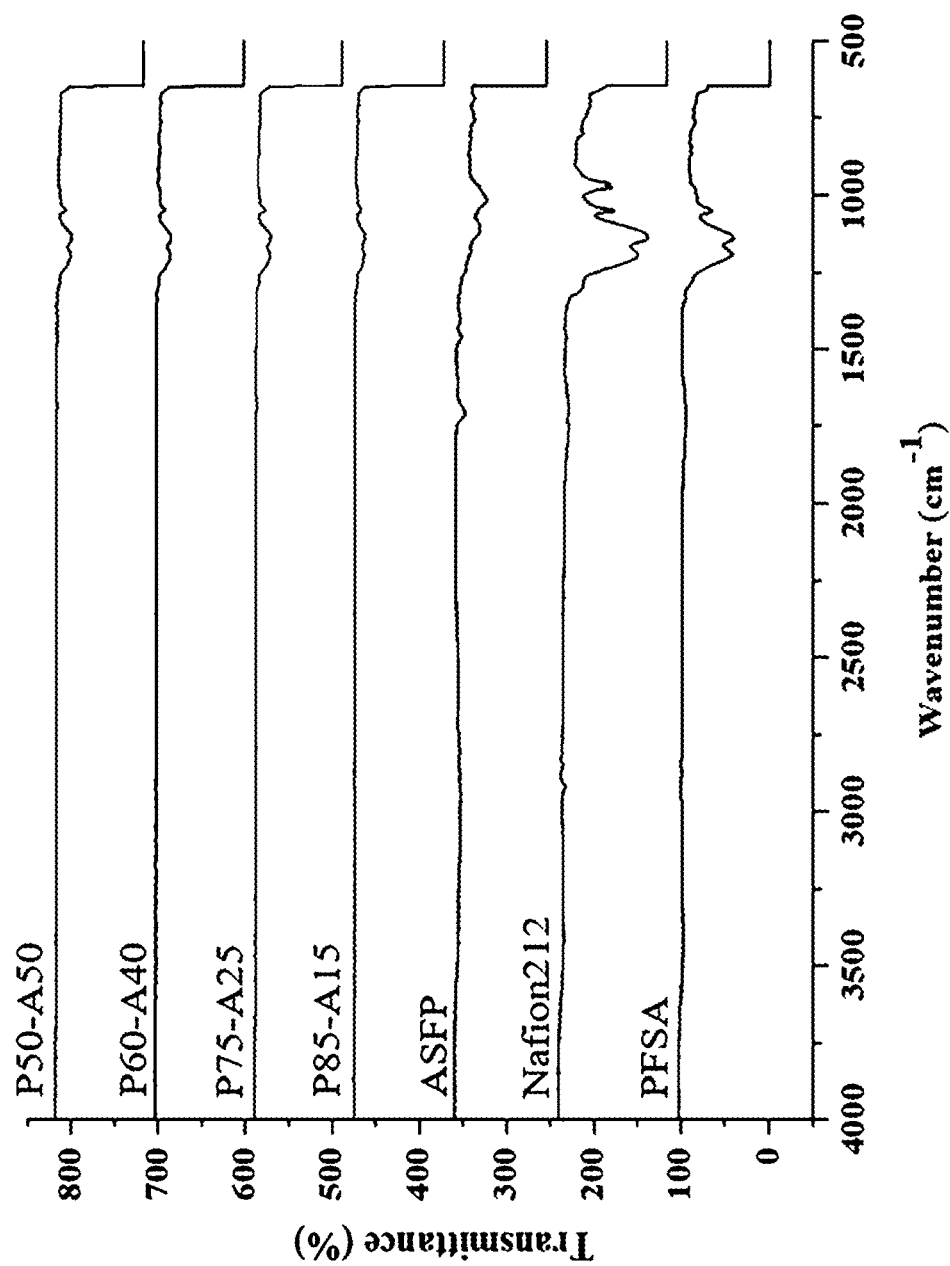
FIG. 5 is a graph showing the results of measurement of FT-IR of a polymer electrolyte composite membrane to which the silane-based sulfonic acid polymer of the present invention is introduced.

The polymer electrolyte composite membranes 1 to 4 manufactured in Examples 2 to 5 were dried in a vacuum oven at 100° C., and FT-IR was performed on the samples to be measured. The results thereof are shown in FIG. 5. As controls, NAFION 212 and PFSA of Comparative Examples 1 and 2 were analyzed and compared.

As shown in FIG. 5, when the amount of ASFP was increased to 15%, 25%, 40% and 50%, the peaks of the C—F and —$SO_3$ bond were shifted to 1206 $cm^{-1}$ and 1144 $cm^{-1}$ and the peak intensity thereof was also increased. The C—F and —$SO_3$ bond of NAFION 212 and the PFSA membrane were observed near 1198 $cm^{-1}$ and 1136 $cm^{-1}$.

Therefore, the peak of ASFP was merged with the peaks of the C—F and —$SO_3$ bond, indicating that, as the peak intensity thereof increases, the ion-conductive material is functionalized by the ASFP polymer.

Test Example 3

The surface morphology and cross-section images of the polymer electrolyte composite membrane 1 obtained in Example 2 were analyzed. The results thereof are shown in FIG. 6.

Figure 6:
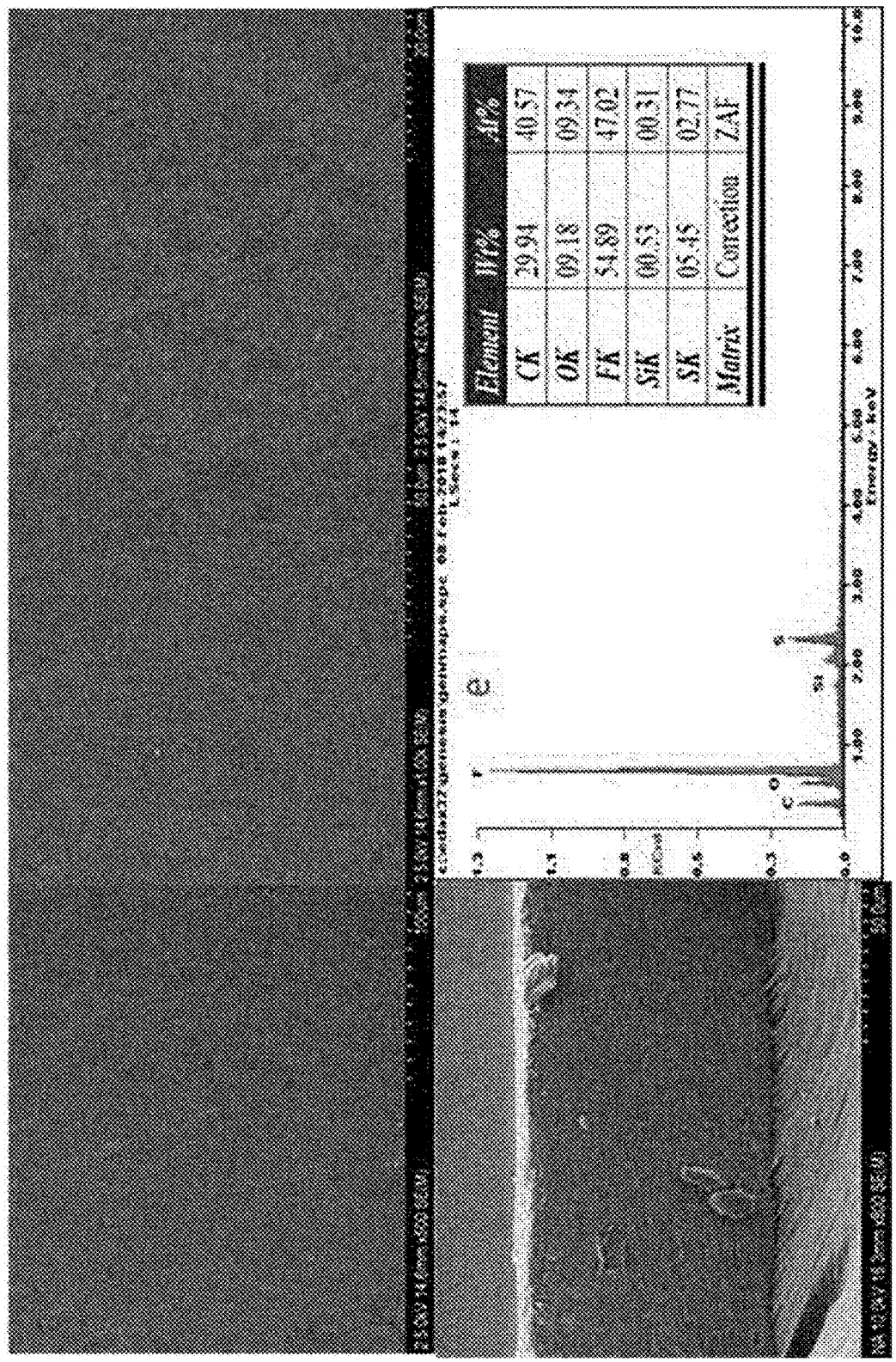
FIG. 6 shows the results of SEM & EDAX of the polymer electrolyte composite membrane to which the silane-based sulfonic acid polymer of the present invention is introduced.

As shown in FIG. 6, the surface of the polymer electrolyte composite membrane was very dense, and the membrane did not crack. Moreover, in order to confirm the dispersion of ASFP in the polymer electrolyte composite membrane, the chemical composition was analyzed through EDAX, from which the presence of Si in ASFP was confirmed.

Test Example 4

The water uptake and dimensional change of the polymer electrolyte composite membranes 1 to 4 manufactured in Examples 2 to 5 were measured as follows. The results thereof are shown in Table 1 below. As controls, NAFION 212 and PFSA of Comparative Examples 1 and 2 were measured and compared.

The samples to be measured were dried in a vacuum oven at 100° C. for 24 hr or more, and then the mass and width/length thereof were measured, and the samples were immersed in deionized water for 24 hr or more. Thereafter, water was removed from the surface of the polymer electrolyte composite membrane, and the weight at room temperature and the dimensional change thereof were measured three times, averaged and substituted into the following equations.

$$WaterUptake\ (\%) = \frac{W_{wet} - W_{dry}}{W_{dry}} s100$$

$$DimensionalChange\ (\%) = \frac{L_{wet} - L_{dry}}{L_{dry}} s100$$

TABLE 1

| | Water Uptake (%) | Dimensional Change (%) |
|---|---|---|
| NAFION 212 | 24 | 14 |
| PFSA | 32 | 16 |
| P85-A15 | 18 | 8 |
| P75-A25 | 25 | 10 |
| P60-A40 | 28 | 12 |
| P50-A50 | 29 | 15 |
| P40-A60 | 32 | 16 |
| SPES | 33 | 20 |
| S80-A20 | 20 | 11 |
| S70-A30 | 35 | 17 |
| S60-A40 | 32 | 15 |
| S50-A50 | 24 | 11 |
| S40-A60 | 16 | 8 |
| S30-A70 | 10 | 7 |

Based on the results of measurement of water uptake and dimensional change of the perfluorinated polymer electrolyte composite membranes 1 to 5, the hydrocarbon-based polymer electrolyte composite membranes 7 to 12, NAFION 212, PFSA and SPES, as shown in Table 1, NAFION 212 exhibited water uptake of 24% and a dimensional change of 14%, and PFSA exhibited water uptake of 32% and a dimensional change of 16%. However, the polymer electrolyte composite membranes 1 to 5 exhibited water uptake of 18 to 32% and a dimensional change of 7.5 to 16%, which are evaluated to be lower than the water uptake and dimensional change of PFSA. Also, the hydrocarbon-based polymer electrolyte composite membranes 7 to 12 exhibited water uptake of 10 to 30% and a dimensional change of 7 to 17%, which are evaluated to be slightly lower than the water uptake and dimensional change of SPES as the comparative example.

All of the polymer membranes have a tendency in which the water uptake and dimensional change increase and then decrease with an increase in the amount of the silane-based functionalized polymer (up to about 25-40 wt % on the chart). This increasing trend is deemed to be because the amorphous area is developed due to a plurality of hydrophilic sites in the silane-based functionalized polymer.

Test Example 5

The ion exchange capacity (IEC) and ion conductivity of the polymer electrolyte composite membranes 1 to 4 manufactured in Examples 2 to 5 were measured as follows. The results thereof are shown in Table 2 below. As controls, NAFION 212 and PFSA of Comparative Examples 1 and 2 were measured and compared.

The thickness and length of each membrane were measured, and the resistance value was determined through a Dupont's 4-probe method. The individual values were substituted into the following equation.

$$IC(S/cm) = \frac{T}{R(\text{resistance})sA(\text{area})}$$

The results of the ion exchange capacity (IEC) and ion conductivity (IC) thus determined are shown in Table 2 below.

As is apparent from Table 2, the ion exchange capacity and ion conductivity of the polymer electrolyte composite membranes 1 to 6 and the polymer electrolyte composite membranes 7 to 12 increased and then decreased with an increase in the amount of the silane sulfonic acid. As described in Test Example 4, it is expected that the ion exchange capacity and ion conductivity also appear in a similar pattern due to the hydrophilicity of the silane-based functionalized polymer.

TABLE 2

| | IEC (mmol/g) | IC (S/cm) |
|---|---|---|
| NAFION 212 | 0.9 | 0.080 |
| PFSA | 1.19 | 0.096 |
| P85-A15 | 0.91 | 0.095 |
| P75-A25 | 0.95 | 0.110 |
| P60-A40 | 0.78 | 0.077 |
| P50-A50 | 0.76 | 0.071 |
| P40-A60 | 0.67 | 0.0610 |
| P30-A70 | 0.49 | 0.0512 |
| SPES | 1.31 | 0.099 |
| S85-A15 | 1.22 | 0.101 |
| S75-A25 | 1.10 | 0.108 |
| S60-A40 | 0.92 | 0.087 |
| S50-A50 | 0.85 | 0.072 |
| S40-A60 | 0.68 | 0.064 |
| S30-A70 | 0.51 | 0.053 |

In the polymer electrolyte composite membrane 4 added with silane sulfonic acid in an amount of about 50% or more based on the amount of the polymer, the polymer composite membrane exhibited ion conductivity of about 0.070 S/cm or more, corresponding to the ion conductivity of NAFION 212. These results show that, by adding silane sulfonic acid to the perfluorinated polymer or the hydrocarbon-based polymer, the weight percent of the ion-conductive polymer was decreased, and also the ion conductivity thereof was ensured to a level corresponding to that of the commercially available membrane, thereby making it possible to manufacture a composite membrane at low cost and to realize superior performance of an energy storage device or a water treatment device.

Test Example 6

In order to measure the permeability of the polymer electrolyte composite membranes 1 to 4 and 6 manufactured in Examples 2 to 5 and 7, the samples immersed in deionized water for 24 hr or more were assembled to a unit cell for a vanadium redox flow battery. Thereafter, 50 ml of a 1.5 M $VOSO_4$/3 M $H_2SO_4$ solution and 50 ml of a 1.5 M $MgSO_4$/3 M $H_2SO_4$ solution were placed in respective electrolyte containers, and the electrolyte solution was allowed to flow toward the unit cell at a flow rate of 20 cc/min. The permeability test was performed for 24 hr, and the samples were collected in the electrolyte container including the $MgSO_4$ solution at intervals of 0.5 hr, 1 hr, 2 hr, 4 hr, 8 hr, 12 hr and 24 hr. A 1.5 M $MgSO_4$ solution was used as a blank, and the concentrations of the collected samples were measured using a UV-vis spectrometer. The results thereof are shown in Table 3 below and in FIG. 7. As controls, NAFION 212 and PFSA of Comparative Example 1 and 2 were measured and compared.

TABLE 3

| | NAFION 212 | PFSA | P85-A15 | P75-A25 | P60-A40 | P50-A50 | P30-A70 |
|---|---|---|---|---|---|---|---|
| Permeability ($cm^2$/min) | $3.18 \times 10^{-7}$ | $31.5 \times 10^{-7}$ | $16.1 \times 10^{-7}$ | $21.5 \times 10^{-7}$ | $27.0 \times 10^{-7}$ | $8.90 \times 10^{-7}$ | $5.20 \times 10^{-7}$ |
| | SPES | S85-A15 | S75-A25 | S60-A40 | S50-A50 | S40-A60 | S30-A70 |
| Permeability ($cm^2$/min) | $6.32 \times 10^{-7}$ | $11.9 \times 10^{-7}$ | $13.2 \times 10^{-7}$ | $5.07 \times 10^{-7}$ | $4.17 \times 10^{-7}$ | $4.00 \times 10^{-7}$ | $3.20 \times 10^{-7}$ |

Figure 7:
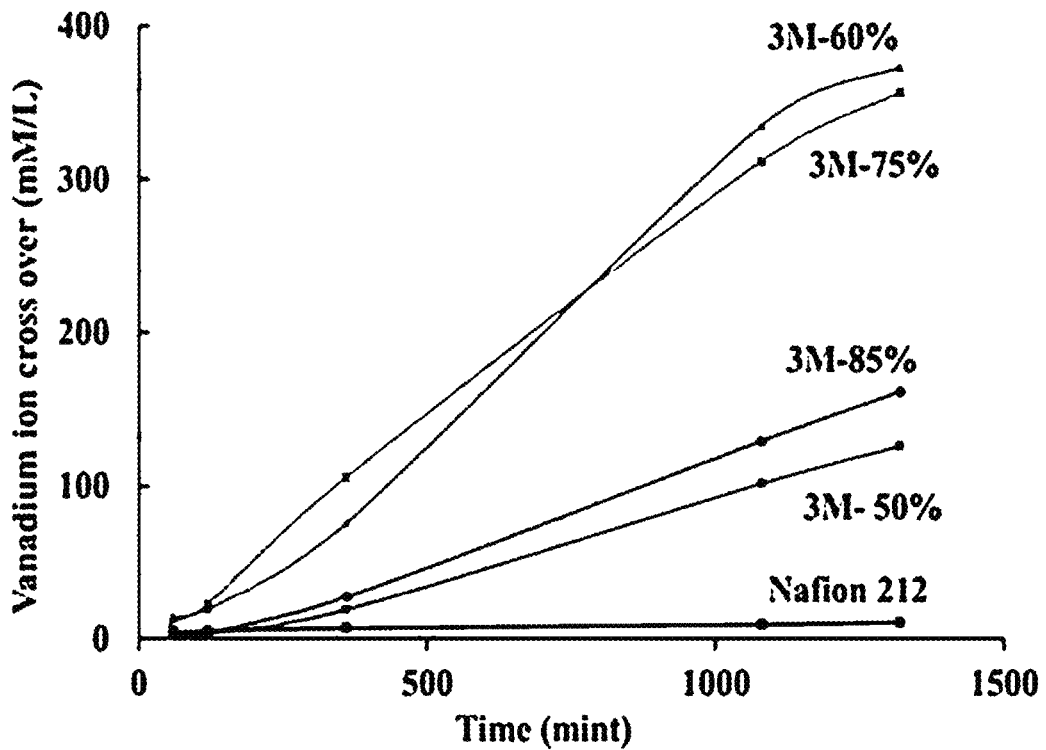
FIG. 7 shows the results of analysis of vanadium tetravalent ion permeability of the polymer electrolyte composite membrane to which the silane-based sulfonic acid polymer of the present invention is introduced.
Figure 7:
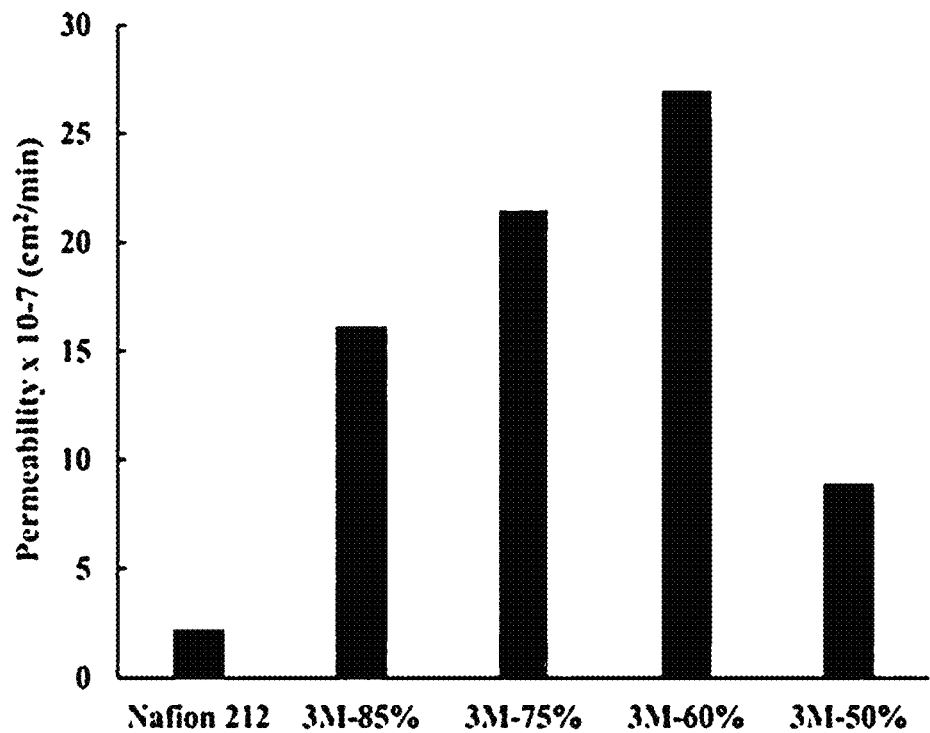

As is apparent from the results of vanadium tetravalent ion permeability of Table 3 and FIG. 7, the introduction of the silane sulfonic acid polymer significantly suppressed permeation performance compared to the conventional PFSA membrane. In particular, as shown in Tables 1 and 2, the ion conductivity of P50-A50 corresponded to that of the NAFION membrane but the permeability thereof was decreased 3.54 times compared to that of the conventional PFSA membrane, directly suggesting that the application of the polymer electrolyte composite membrane introduced with silane sulfonic acid to the energy storage device is capable of realizing a long lifespan and high performance.

Test Example 7

Figure 8:
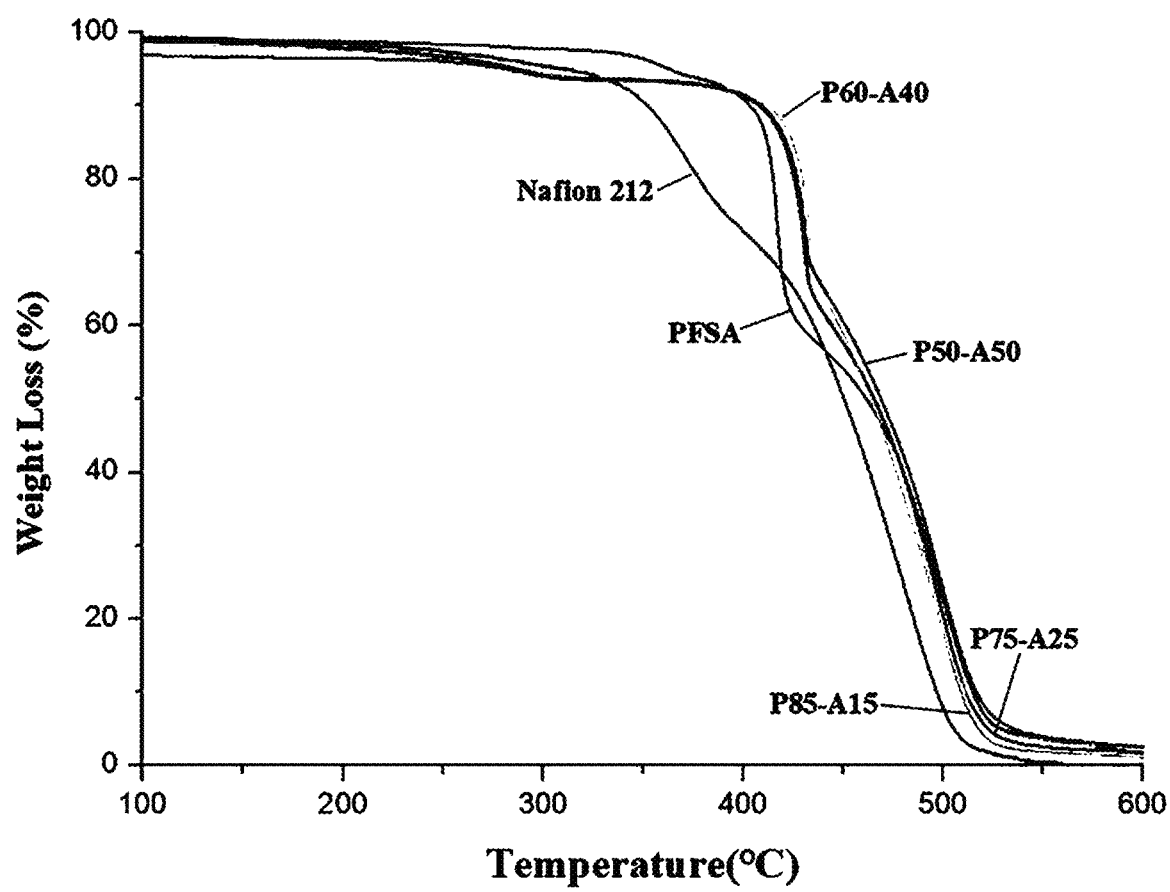
FIG. 8 shows the results of analysis of thermal stability of the polymer electrolyte composite membrane to which the silane-based sulfonic acid polymer of the present invention is introduced.
Figure 9:
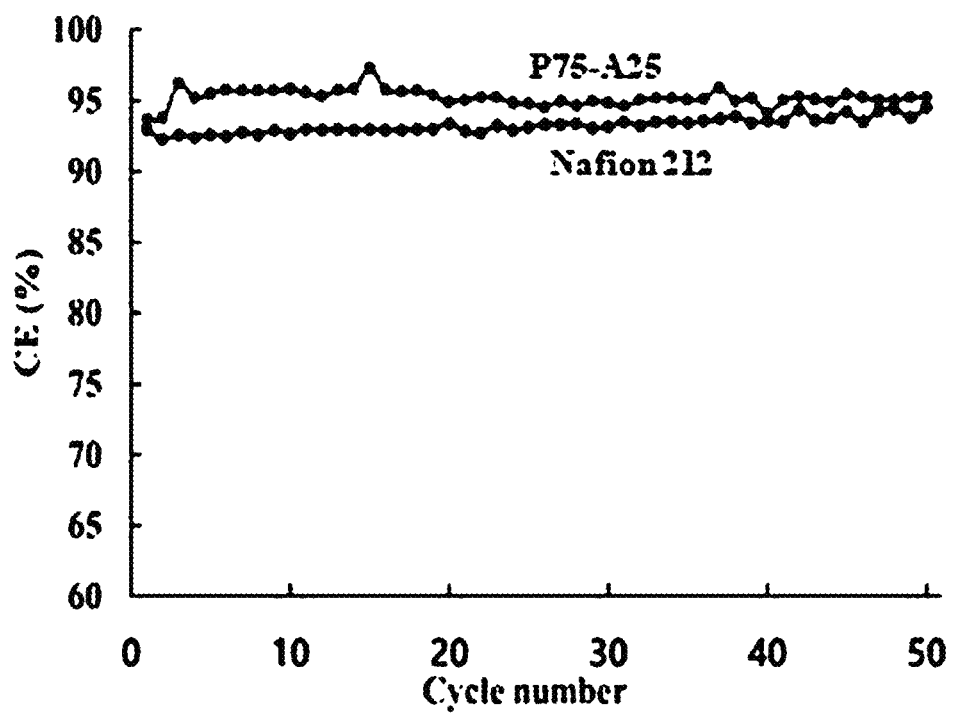
FIG. 9 is a graph showing the results of measurement of coulombic efficiency of a VRFB unit cell when using the polymer electrolyte composite membrane to which the silane-based sulfonic acid polymer (ASFP) of the present invention is applied and a NAFION 212 membrane as a control.
Figure 10:
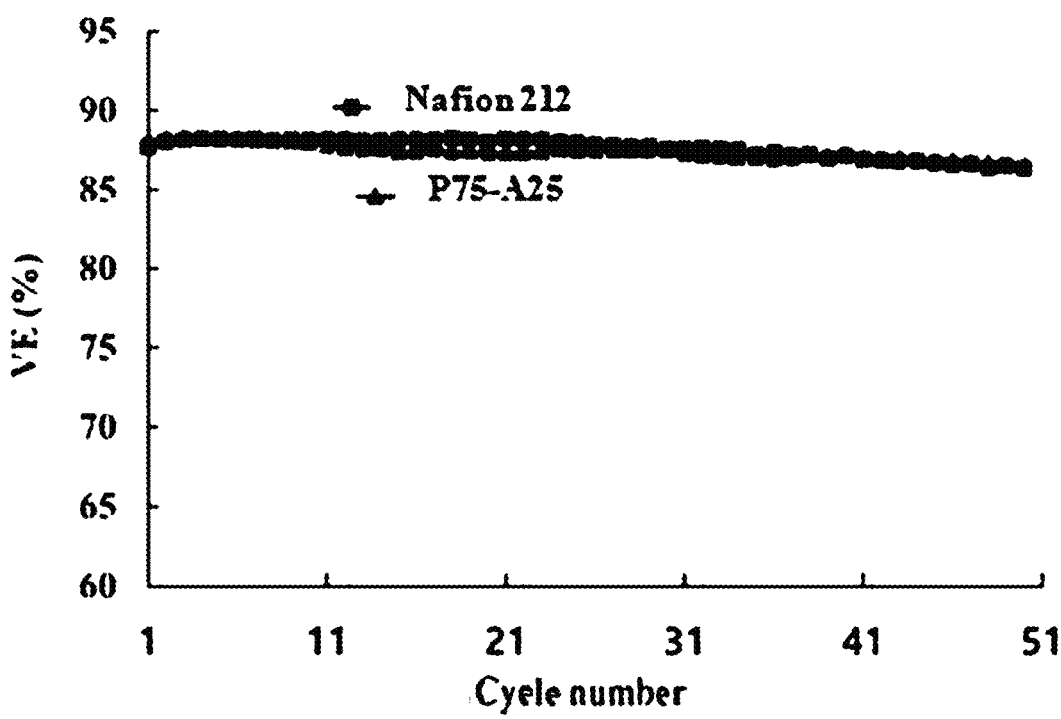
FIG. 10 is a graph showing the results of measurement of voltage efficiency of a VRFB unit cell when using the polymer electrolyte composite membrane to which the silane-based sulfonic acid polymer (ASFP) of the present invention is applied and the NAFION 212 membrane as a control.
Figure 11:
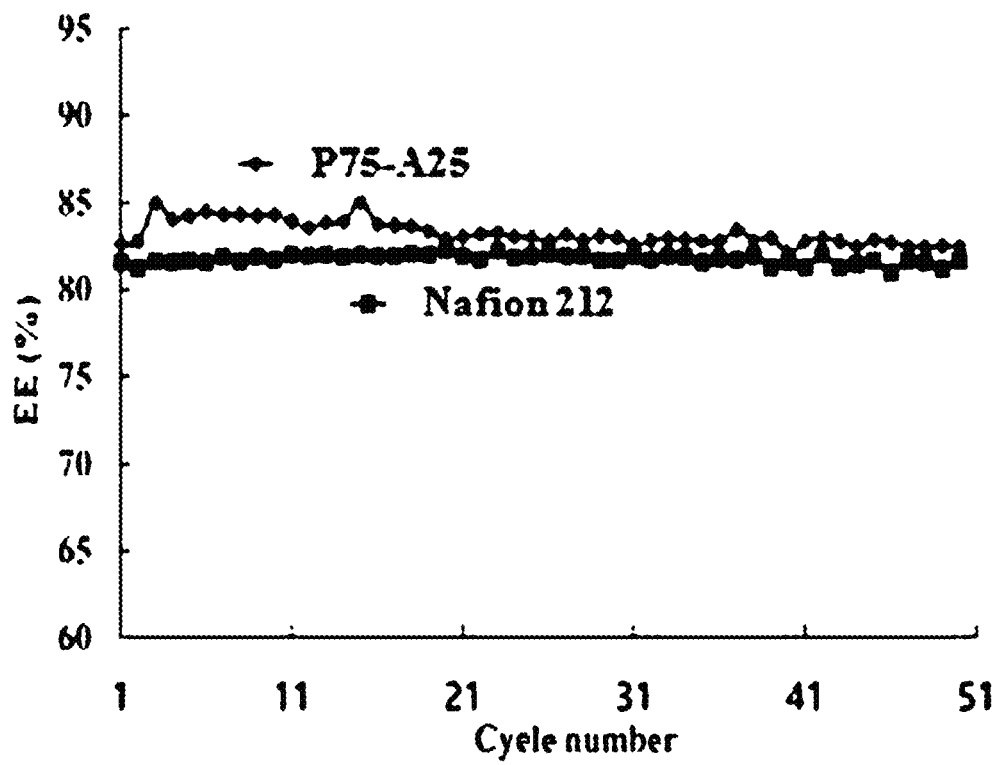
FIG. 11 is a graph showing the results of measurement of energy efficiency of a VRFB unit cell when using the polymer electrolyte composite membrane to which the silane-based sulfonic acid polymer (ASFP) of the present invention is applied and the NAFION 212 membrane as a control.
Figure 12:
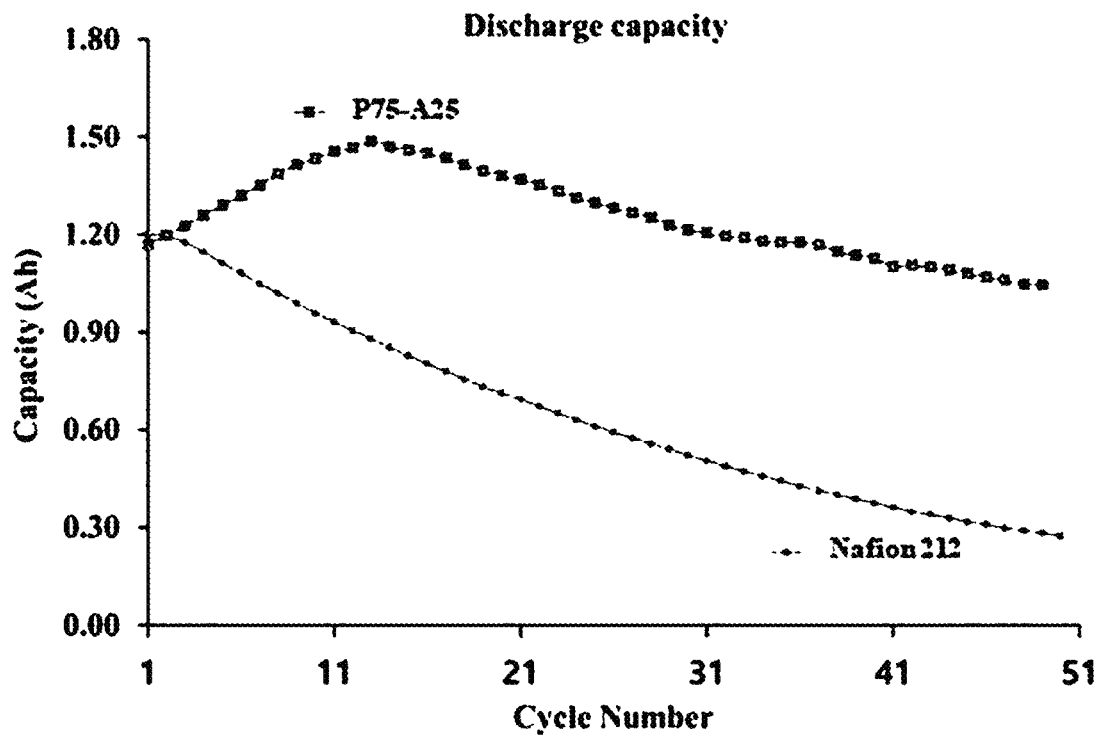
FIG. 12 is a graph showing the results of measurement of capacity retention efficiency of a VRFB unit cell when using the polymer electrolyte composite membrane to which the silane-based sulfonic acid polymer (ASFP) of the present invention is applied and the NAFION 212 membrane as a control.

The thermal stability of the polymer electrolyte composite membranes 1 to 4 manufactured in Examples 2 to 5 was measured through thermogravimetric analysis (TGA). The results thereof are shown in FIG. 8. As controls, NAFION 212 and PFSA of Comparative Example 1 and 2 were measured and compared.

The polymer electrolyte composite membranes 1 to 4 were heated from room temperature to 600° C. at a rate of 10° C./min, and the thermal stability thereof was analyzed. Upon heating to 400° C., thermal decomposition of very small amounts of water molecules and hydroxyl groups present in the compound occurred, during which significant weight loss occurred. On the other hand, a total of two steps of thermal decomposition occurred at temperatures higher than 400° C. Decomposition of the sulfonic acid group occurred near 450° C., and then silicon decomposed at a higher temperature. Based on the analysis of thermal stability, the polymer electrolyte composite membranes 1 to 4 obtained in Examples 2 to 5 exhibited superior thermal stability even in the temperature range of 400° C. or higher due to the introduction of silane sulfonic acid, compared to the conventional PFSA membrane, which suggests that applicability thereof to fuel cells and secondary batteries operating at high temperatures is high.

Test Example 8

The polymer electrolyte composite membrane 2 (P75-A25) obtained in Example 3 was assembled to a unit cell for a vanadium redox flow battery, after which cell testing was performed at a current density of 80 $mA/cm^2$. The results thereof are shown in Table 4 below and in FIGS. 9 to 12.

TABLE 4

| Classification | CE (%) | VE (%) | EE (%) |
|---|---|---|---|
| NAFION 212 | 93.27 | 87.64 | 81.74 |
| P75-A25 | 95.24 | 87.42 | 83.26 |

As is apparent from Table 4, the CE, VE and EE values of the polymer electrolyte composite membrane 2 (P75-A25) introduced with ASFP were 95.24%, 87.42%, and 83.26%, respectively, corresponding to those of NAFION 212. In particular, as shown in the capacity reduction graph of FIG. 12, the P75-A25 membrane exhibited a superior capacity retention effect compared to that of NAFION 212. Based on the above analysis, it can be directly confirmed that long-term operation and superior performance can be achieved when the polymer electrolyte composite membrane introduced with ASFP according to the present invention is applied to an energy storage device.

The above test results illustrate only the case in which the polymer electrolyte composite membrane of the present invention is used in a redox flow battery, but when used in energy storage devices such as other kinds of secondary batteries or fuel cells, it can be expected that not only cell performance but also long-term operation performance can be improved.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A silane-based functionalized polymer represented by the following formula:

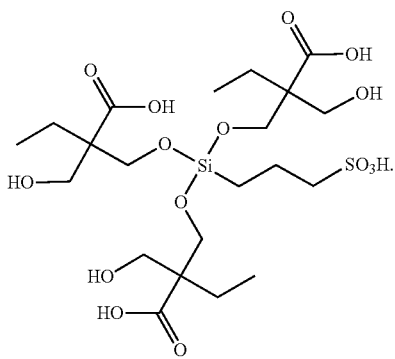 [SMILES: CCC(CO)(CO[Si](CCCS(=O)(=O)O)(OCC(CC)(CO)C(=O)O)OCC(CC)(CO)C(=O)O)C(=O)O]

2. A polymer electrolyte composite membrane prepared by reacting at least one of a perfluorinated polymer and a hydrocarbon-based polymer, and a silane-based functionalized polymer represented by the following formula:

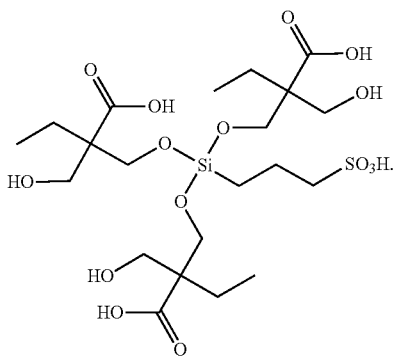 [SMILES: CCC(CO)(CO[Si](CCCS(=O)(=O)O)(OCC(CC)(CO)C(=O)O)OCC(CC)(CO)C(=O)O)C(=O)O]

3. The polymer electrolyte composite membrane of claim 2, wherein the at least one of the perfluorinated polymer and the hydrocarbon-based polymer, and the silane-based functionalized polymer are used at a weight ratio of 95:5 to 30:70.

4. The polymer electrolyte composite membrane of claim 2, wherein the perfluorinated polymer is at least one selected from the group consisting of sulfonated tetrafluoroethylene based fluoropolymer-copolymer, perfluorinated sulfonic acid polymer (PFSA), polytetrafluoroethylene, poly(vinylidene fluoride), poly(vinyl fluoride), poly(vinylidene fluoro-co-perfluorinated alkylvinylether), and combinations thereof.

5. The polymer electrolyte composite membrane of claim 2, wherein the hydrocarbon-based polymer is at least one selected from the group consisting of sulfonated polystyrene, sulfonated polyether ketone, sulfonated polyether ether ketone, sulfonated poly(4-phenoxybenzoyl-1,4-phenylene), sulfonated polyether sulfone, sulfonated polyarylene ether sulfone, sulfonated poly(phenylquinoxaline), sulfonated polysulfone, sulfonated poly(2,6-dimethyl-1,4-phenylene oxide), sulfonated polyimide, sulfonated polybenzimidazole, and sulfonated polyphenylene sulfide.

6. The polymer electrolyte composite membrane of claim 2, wherein an amount of the silane-based functionalized polymer is in proportion to water uptake of the composite membrane and is in inverse proportion to ion conductivity of the composite membrane.

* * * * *